US008113420B2

(12) United States Patent
Lee et al.

(10) Patent No.: US 8,113,420 B2
(45) Date of Patent: Feb. 14, 2012

(54) CHECK RECEIVING DEVICE AND METHOD OF AUTOMATIC TELLER MACHINE

(75) Inventors: Hee Chang Lee, Anyang-si (KR); Jae Hoon Kwak, Gimpo-si (KR); Woo Ho Lee, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 485 days.

(21) Appl. No.: 12/342,372

(22) Filed: Dec. 23, 2008

(65) Prior Publication Data

US 2009/0159664 A1 Jun. 25, 2009

(30) Foreign Application Priority Data

Dec. 24, 2007 (KR) ........................ 10-2007-0136890

(51) Int. Cl.
*G06Q 40/00* (2006.01)
*G07D 11/00* (2006.01)
*G07F 19/00* (2006.01)

(52) U.S. Cl. ......... 235/379; 271/184; 271/185; 271/186

(58) Field of Classification Search .................. 235/379, 235/380

See application file for complete search history.

(56) References Cited

U.S. PATENT DOCUMENTS 6,478,298 B1 * 11/2002 Mandel .......................... 271/298
7,090,121 B2 * 8/2006 Wanibe et al. ................ 235/379

* cited by examiner

*Primary Examiner* — Thien M. Le
*Assistant Examiner* — Christopher Stanford
(74) *Attorney, Agent, or Firm* — Fenwick & West LLP

(57) ABSTRACT

A check receiving device of an automatic teller machine having a receiving unit and a storage unit to accumulate the check unit includes a first transfer unit having inspection devices installed along a transferring; a second transfer unit communicated with an end of the first transfer unit along the transferring path such that the check transferred from the first transfer unit stands by; a third transfer unit communicated with an end of the second transfer unit along the transferring path and receiving the check; a fourth transfer unit communicated with a communicating position between the second transfer unit and the third transfer unit; and a gate installed at a communicating position of the second transfer unit, the third transfer unit, and the fourth transfer unit. The gate changes a transferring direction of the check positioned in the third transfer unit to the fourth transfer unit.

3 Claims, 4 Drawing Sheets

CHECK RECEIVING DEVICE AND METHOD OF AUTOMATIC TELLER MACHINE

RELATED APPLICATIONS

This application claims priority under 35 U.S.C. §119(a) to Korean Patent Application No. 10-2007-0136890 filed on Dec. 24, 2007, which is incorporated by reference herein in its entirety.

FIELD OF THE INVENTION

The present invention relates to a money-receiving device of an automatic teller machine, and more particularly to a check-receiving device for an automatic teller machine having a gate to determine a transfer path of a check according to the status of a received check.

BACKGROUND OF THE INVENTION

An automatic teller machine (ATM) is an apparatus assisting basic finance services such as deposit and withdrawal of money without a bank teller in various places and time. ATMs are classified into a cash dispenser and a cash dispenser and receiver. Recently, the ATMs are used to deposit and withdraw checks as well as cash, to update a bankbook, for giro transfers, to issue tickets, and so forth.

Currently, the ATMs are being widely used in banks and other financial agencies. More convenient the ATMs, the more the customers will use the ATMs. The use of ATMs as well as the amount of money involved in each financial transaction is also increasing.

Since the ATM having only one function of dispensing cash transfers preset types of bank notes as much as a input amount of money to a cash dispensing outlet, the ATM can perform normal financial transaction unless jamming of the bank note and/or abnormal transfer of two bank notes at a time. However, the ATM having a function of receiving cash must check things other than the jamming and the abnormal transfer of two bank notes for normal financial transaction. For example, whether other types of bank notes or a forged bank note is inserted, a crumpled or damaged bank note is inserted, and a correct direction of bank notes must be checked. Moreover, since customers are not familiar with the ATM, there is some possibility of mishandling of the causing more frequent malfunction of the ATM.

Particularly, checks have high face values, frequently counterfeited, and differently from cash in that it may lose its value in a case of a dishonored check. Thus, more careful handling of checks is needed that cash. Currently, serial numbers of the check are checked for validity whenever receiving the check.

Checks accumulated in the ATM are transferred one by one individually. For example, a conventional check transfer unit includes a pickup roller, a feed roller, and a guide roller. The check transfer unit transfers the checks by picking up one of the accumulated checks with the pickup roller and transferring the picked check along a transferring path while passing the feed roller and the guide roller. The checks are transferred to a storage unit via a transferring path and accumulated in the storage unit one by one individually.

FIG. 1 is a schematic view illustrating a conventional receiver module 110 of an ATM 101 to determine whether to reject or store a check.

The check received through a receiving unit 102 and being transferred along the transferring path 120 passes a contact image sensor (CIS) and a magnetic ink character reader (MICR) located on the transferring path 120 such that information on the check is read, then turns at an upper corner of the transferring path 120 to standby in a stack 130. The information obtained from the check is checked during the standby in the stack 130 and the check is transferred into an insertion path 140 and stored in a storage unit 150 when the check is valid. When the check is not valid, the check is reversely transferred to the upper transferring path 120 and is rejected out through the receiving unit 102.

In order to smoothly transfer checks in the conventional device, the stack 130 must have a height as high as a length of the check and thus the ATM has a minimum height equal to a height adding the height of the stack 130 and the height of the storage 150. Thus, it is difficult to miniaturize the ATM.

SUMMARY OF THE INVENTION

Therefore, the present invention has been made in view of the above problems, and it is an aspect of the present invention to provide a check receiving device of an automatic teller machine having a small receiver module by modifying a structure of determining a transferring path of a bank note, particularly, a check.

In accordance with one aspect of the present invention, there is provided a check receiving device of an automatic teller machine having a receiving unit to receive a check and a storage to accumulate the check received through the receiving unit, the check receiving device including: a first transfer unit having inspection devices installed along a transferring path to inspect information of the check received through the receiving unit; a second transfer unit communicated with an end of the first transfer unit along the transferring path such that the check transferred from the first transfer unit stands by; a third transfer unit communicated with an end of the second transfer unit along the transferring path and receiving the check to be accumulated in the storage from the second transfer unit; a fourth transfer unit communicated with a communicating position between the second transfer unit and the third transfer unit toward the storage along the transferring path and receiving the check positioned in the third transfer unit; a gate installed at a communicating position of the second transfer unit, the third transfer unit, and the fourth transfer unit and changing a transferring direction of the check positioned in the third transfer unit to the fourth transfer unit; and a controller controlling each of the transfer units to be driven forward and reversely.

In accordance with another aspect of the present invention, there is provided a method of loading a check received from a receiving unit in a storage of an automatic teller machine, the method including: transferring the check along a transferring path to press a gate; making the check pressing the gate stand by; determining whether the check standing by is to be moved forward or backward according to confirmation or cancellation of a deposit of the check by a user, respectively; transferring the check standing by forward until the check does not press the gate any more, thereby forming new transferring path, when the deposit is confirmed; and transferring the forwardly moved check reversely along the new transferring path to load in the storage.

The check receiving device of an ATM may be applied to a bank note, a merchandise coupon, and other paper moneys or paper material in addition to the check.

According to the check receiving device of the present invention, since the third transfer unit is installed at a position lower than or equal to a height of the upper end of the storage, a height of the receiver module can be reduced. Thus, the receiver module can be miniaturized so that the automatic teller machine can also be compact. Since the gate determines whether to receive or to reject the check with a simple spring structure, the structure of the receiver module is simplified.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENT

Hereinafter, preferred embodiments of the present invention will be described in detail with reference to the accompanying drawings.

Figure 1:
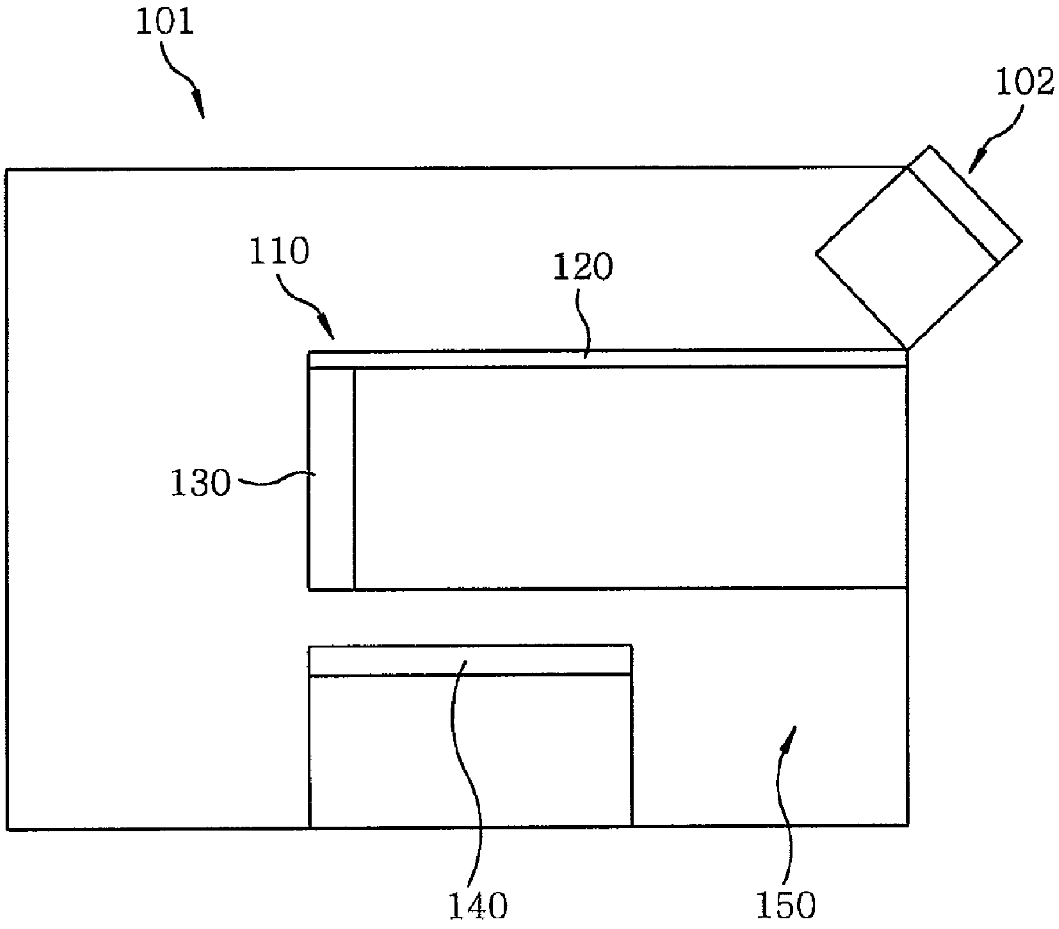
FIG. 1 (PRIOR ART)
FIG. 1 is a schematic view illustrating a conventional structure of determining whether to reject or store a check.
Figure 2:
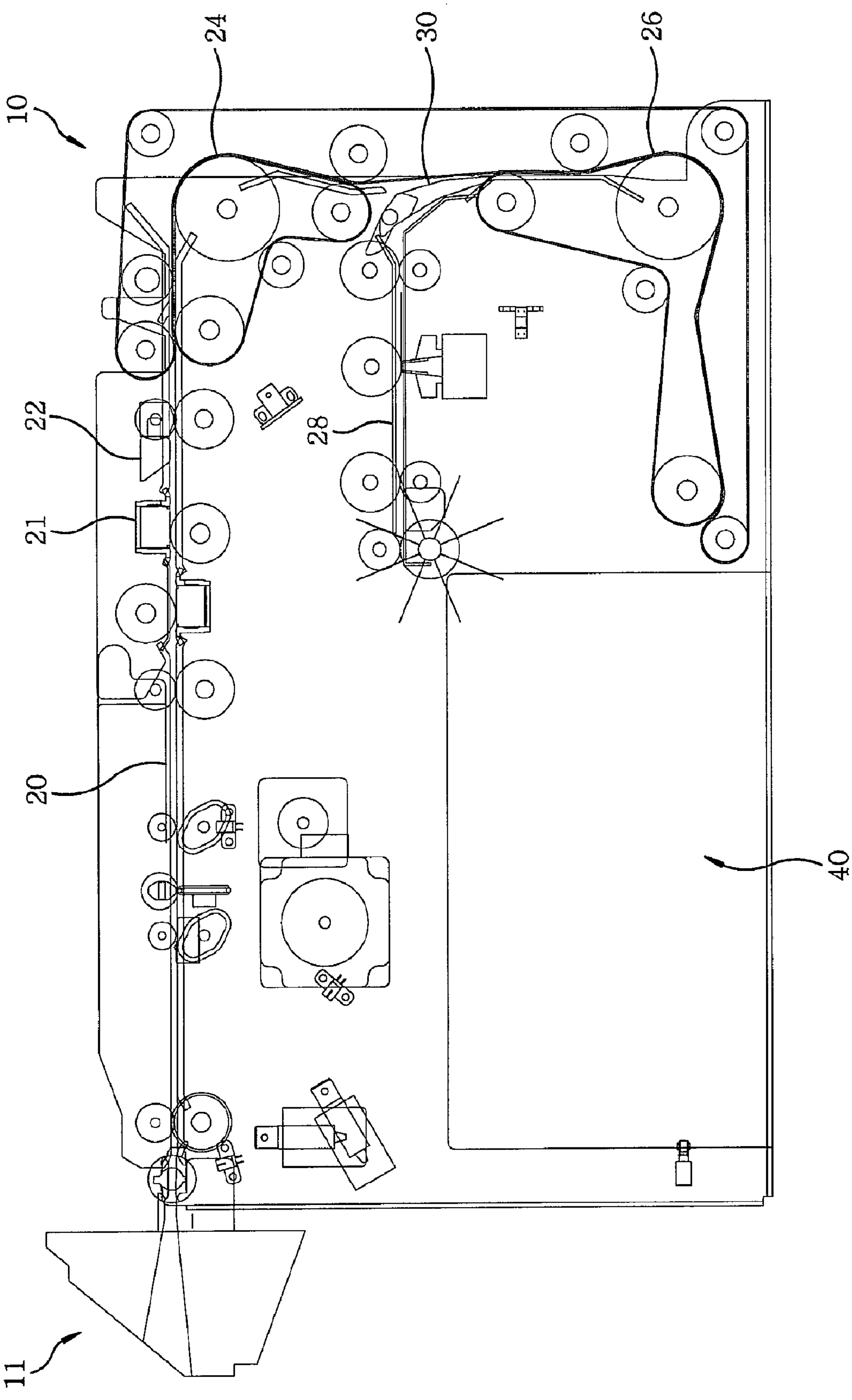
FIG. 2 is a schematic view illustrating a check receiver module of an automatic teller machine according to an embodiment of the present invention.
Figure 3:
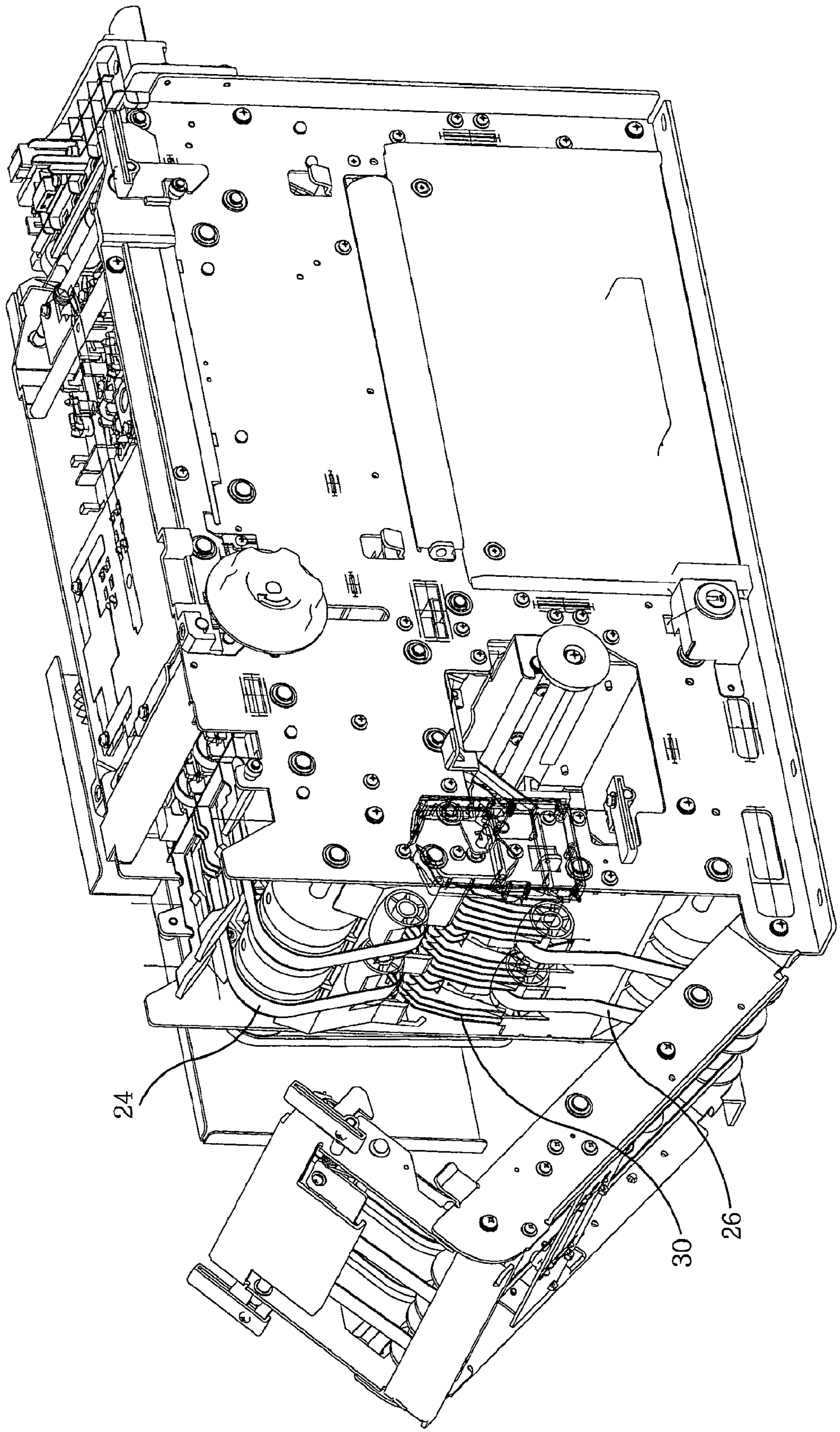
FIG. 3 is a detailed perspective view of the receiver module of FIG. 2.
Figure 4:
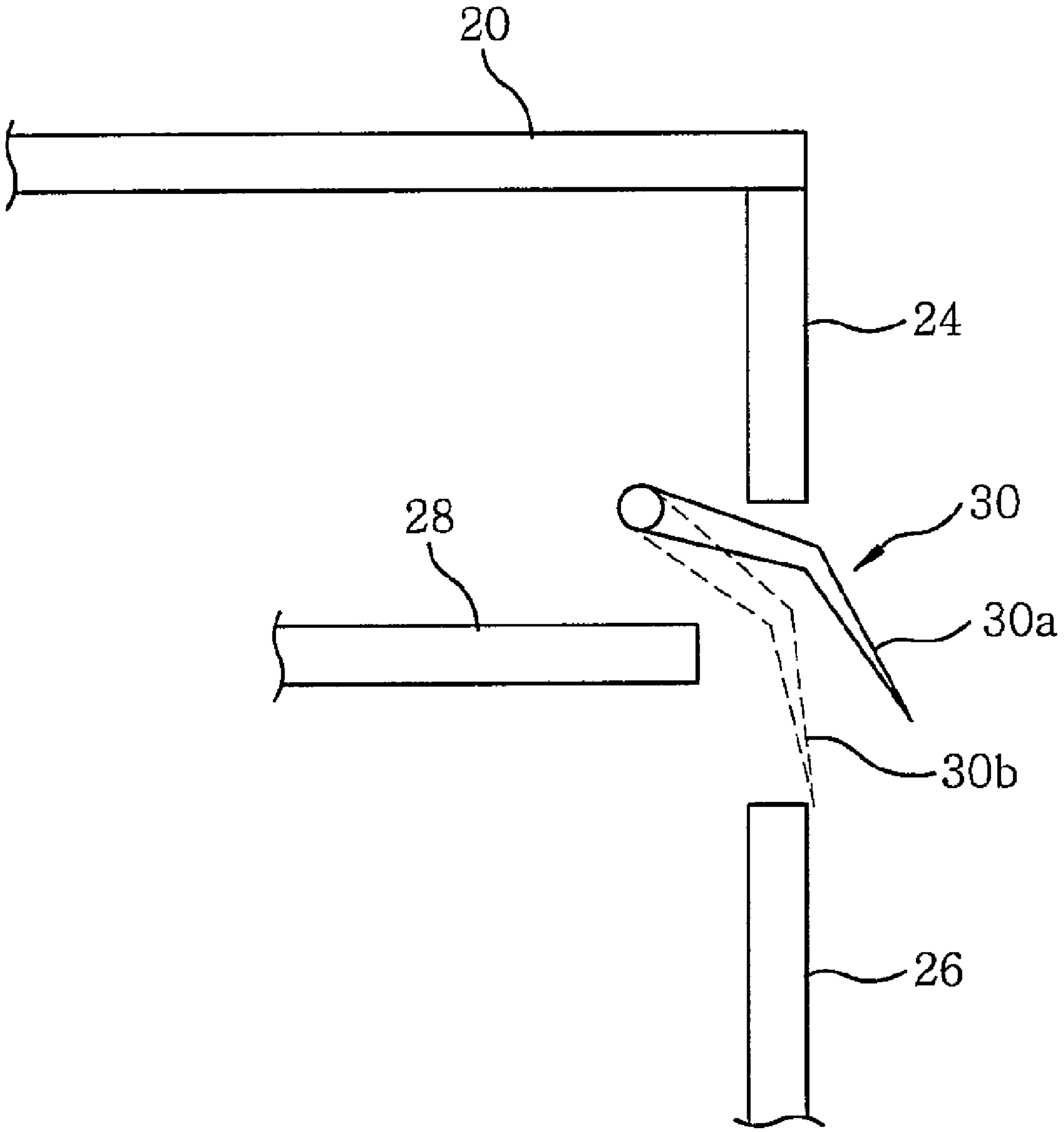
FIG. 4 is a schematic view illustrating a movement of a gate.

FIG. 2 is a schematic view illustrating a check receiving device (or a check receiver module) of an automatic teller machine according to an embodiment of the present invention, FIG. 3 is a detailed perspective view of the receiver module, and FIG. 4 is a schematic view illustrating a movement of a gate.

The automatic teller machine (ATM) is an apparatus to receive and dispense cash or checks and includes several functional modules such as a magnetic card reading module, a bankbook updating module, a user interface module, a check receiver module 10, and a dispenser module, which are installed in a single housing.

The check receiver module 10 is enclosed in a module housing (not shown) including a receiving unit 11 positioned at an upper front side thereof and a shutter (not shown) through which checks are received into the receiving unit 11. The check received through the receiving unit 11 is transferred to a first transfer unit 20 extending from the upper front side to the upper rear side of the receiving module 10. A second transfer unit 24 is vertically mounted to the rear side of the receiver module 10 such that the check transferred from the first transfer unit 20 stands by. A gate 30 is positioned at the lower side of the second transfer unit 24. An upper portion of the gate 30 is pivotally fixed near to the lower end of the second transfer unit 24 and is elastically supported by a spring to be slightly inclined from a vertical line, that is, a lower end of the gate 30 is positioned behind the upper end of the gate 30. When pressure is applied to the gate 30, i.e., the check passes through the gate 30, the gate 30 pivots against the action of the spring. Under the gate 30, a third transfer unit 26 is arranged to be spaced apart from the second transfer unit 24. A fourth transfer unit 28 is horizontally located above the third transfer unit 26. A storage 40 is positioned near a front end of the fourth transfer unit 28.

The first transfer unit 20 includes a check counting sensor, a genuine check detecting sensor, a check damage inspecting sensor. In a case of a module receiving and dispensing checks, the first transfer unit 20 may include a contact image sensor (CIS) to detect a serial number of a check, a magnetic ink character reader (MICR), an endorsement printer, and an image scanner. As such, the ATM determines whether the check is real or not through the various sensors and inspection devices, and may inquire a status of check value and other restrictions of the check through a database connected to a network of a bank. The ATM confirms the reception of the check only when it assumes normal transaction through above mentioned procedures. When the transaction is not assumed normal, all or some of the received checks are rejected and the transaction is terminated.

Each of the transfer units may include sensors detecting entry or transfer of the checks and is controlled to be driven forward and reversely according to the inspected result of an inspection device based on detected signals from the sensors.

Whether the check transferred along the first transfer unit 20 is valid is determined and information of the check is read through the CIS 21 and MICR 22, respectively. The check passed through the first transfer unit 20 changes direction and is transferred to the second transfer unit 24. The check may stand by in the second transfer unit 24 during the inspection of the check by the inspection device or further move downward to standby, thereby contacting the gate 30. The check may stretch from the second transfer unit 24 to the third transfer unit 26 through the gate 30. When the check contacts the gate 30, the gate 30 elastically supported by the spring and positioned at an initial position 30*a* is pressed by the check and pivots about the upper portion thereof to a pressing position 30*b* such that a first path communicating the second transfer unit 24 with the third transfer unit 26 is formed.

When the information of the check obtained by CIS 21 or the MICR 22 during the standby of the check is verified, thereby proving the validity of the check, the check must be inserted into the storage 40. The check further moves in the transfer direction, that is, downwardly. When the check does not contact the gate 30, the check moves forward and presses the gate 30 such that the gate 30 pivots to the pressing position 30*b* and the first path through which the check is transferred is formed. The check then passes through the first path and is transferred to the third transfer unit 26. When the check is transferred to the third transfer unit 26, the upper end of the check departs from the gate 30. At that time, the pressure acting on the gate 30 by the check is removed and the gate 30 pressed by the check is inclined again by the action of the spring. In other words, the lower end of the gate 30 moves backward to the initial position 30*a* and a second path through which the check passes is formed between the gate 30 and the fourth path 28. The check is reversely transferred from the third transfer unit 26 to the fourth transfer unit 28 after passing through the gate 30 and a rear end of the fourth transfer unit 28 and is loaded in the storage 40.

When the check is determined abnormal according to the information obtained during the standby of the check, the check is not transferred to the storage 40 but must be rejected out. The check is departed from the second transfer unit 24 to be reversely transferred to the first transfer unit 20 and is transferred to the receiving unit 11. When the check is reversely transferred and is separated from the gate 30, the gate 30 is pivoted back and elastically supported at the initial position 30*a* by the action of the.

The above-mentioned operations are repeated for checks received later depending on the validity of the check.

While the invention has been shown and described with respect to the preferred embodiments, it will be understood by those skilled in the art that various changes and modification may be made without departing from the scope of the invention as defined in the following claims.

What is claimed is:

1. A check receiving device of an automatic teller machine the check receiving device comprising:

a first transfer unit having inspection devices installed along a transferring path, the inspection devices configured to inspect a check received through a receiving unit;

a second transfer unit connected to an end of the first transfer unit disposed along the transferring path, the second transfer unit partially and stationarily holding the check in a stand-by-state awaiting input from a user;

a third transfer unit connected to an end of the second transfer unit disposed along the transferring path, the third transfer unit configured to receive the check for storing in a storage unit from the second transfer unit, the third transfer unit partially and stationarily holding the check in the stand-by-state in conjunction with the second transfer unit;

a fourth transfer unit connected to a junction between the second transfer unit and the third transfer unit, the fourth transfer unit configured to receive the check for storing in the storage unit from the third transfer unit; and a gate installed at the junction and configured to route the check from the second transfer unit to the third transfer unit or to route the check from the third transfer unit to the fourth transfer unit; and wherein the gate is configured to open a first path from the second transfer unit to the third transfer unit in the stand-by-state by pressure exerted by the check, the gate is further configured to return to a position closing the first path and forming a second path from the third transfer unit to the fourth transfer unit when the pressure exerted by the check is removed from the gate.

2. The check receiving device of claim 1, further comprising a controller for controlling operations of the first transfer unit, the second transfer unit, the third transfer unit and the fourth transfer unit, the controller configured to operate to move the check in the stand-by-state to the third transfer unit responsive to receiving a confirmation to deposit the check in the storage, the controller further configured to return the check via the first transfer unit responsive to receiving cancellation of the deposit.

3. A method of loading a check received from a receiving unit in a storage unit of an automatic teller machine, the method comprising:

transferring the check from the receiving unit a first transfer unit to a second transfer unit;

inspecting the check while the check is being transferred along the first transfer unit;

placing the check in a stand-by-state wherein the check is partially and stationarily held in the second transfer unit and partially and stationarily held in a third transfer unit by causing the check to press a gate into a first position opening a first path between the second transfer unit and the third transfer unit making the check pressing the gate stand by;

receiving confirmation to deposit the check in the stand-by-state or cancellation- to deposit the check from a user;

responsive to receiving the confirmation to deposit the check:

causing the gate to revert from the first position to a second position by transferring the check in the stand-by-state from the second transfer unit to the third transfer unit via the first path, a second path from the third transfer unit to a fourth transfer unit opened in the second position; and after completing the transfer of the check from the second transfer unit to the third transfer unit, transferring the check from the third transfer unit to the fourth transfer unit by moving the check along the second path; and responsive to receiving cancellation to deposit the check:

moving the check in the stand-by-state in a reverse direction by the second transfer unit to the first transfer unit; and moving the check by the first transfer unit to the receiving unit.

* * * * *

UNITED STATES PATENT AND TRADEMARK OFFICE

CERTIFICATE OF CORRECTION

PATENT NO. : 8,113,420 B2
APPLICATION NO. : 12/342372
DATED : February 14, 2012
INVENTOR(S) : Hee Chang Lee It is certified that error appears in the above-identified patent and that said Letters Patent is hereby corrected as shown below:

In claim 1, Column 4, Line 66, insert --,-- after “machine”.

In claim 3, Column 6, Line 4, insert --along-- after “unit”.

In claim 3, Column 6, Lines 13-14, delete “making the check pressing the gate stand by;” after “unit”.

Signed and Sealed this
Third Day of July, 2012

David J. Kappos
*Director of the United States Patent and Trademark Office*